(12) United States Patent
Hoglund (10) Patent No.: US 9,403,288 B2
(45) Date of Patent: Aug. 2, 2016

(54) CAST SHEET AND METHOD OF PRODUCING THE SAME

(75) Inventor: Lars Hoglund, Bromma (SE)

(73) Assignee: BUTONG AB, Bromma (SE)

( * ) Notice: Subject to any disclaimer, the term of this patent is extended or adjusted under 35 U.S.C. 154(b) by 825 days.

(21) Appl. No.: 13/505,305

(22) PCT Filed: Nov. 4, 2010

(86) PCT No.: PCT/SE2010/051206
§ 371 (c)(1),
(2), (4) Date: May 1, 2012

(87) PCT Pub. No.: WO2011/056136
PCT Pub. Date: May 12, 2011

(65) Prior Publication Data
US 2012/0219753 A1    Aug. 30, 2012

(30) Foreign Application Priority Data

Nov. 4, 2009 (SE) .................................... 0901412
Feb. 22, 2010 (SE) .................................... 1000174

(51) Int. Cl.
| | | |
|---|---|---|
| B32B 3/24 | (2006.01) |
| B32B 3/30 | (2006.01) |
| B28B 3/00 | (2006.01) |
| B28B 3/12 | (2006.01) |
| B28B 3/16 | (2006.01) |
| B28B 7/18 | (2006.01) |
| B28B 11/00 | (2006.01) |
| B29C 33/40 | (2006.01) |

(52) U.S. Cl.
CPC ............... *B28B 3/003* (2013.01); *B28B 3/126* (2013.01); *B28B 3/16* (2013.01); *B28B 7/186* (2013.01); *B28B 11/003* (2013.01); *B29C 33/40* (2013.01); *Y10T 428/24273* (2015.01); *Y10T 428/24479* (2015.01)

(58) Field of Classification Search
CPC ...... B28B 11/003; B28B 3/003; B28B 3/126; B28B 3/16; B28B 7/186; B29C 33/40; B29C 33/42
USPC .......................................................... 264/199
See application file for complete search history.

(56) References Cited

U.S. PATENT DOCUMENTS 2,030,002 A * 2/1936 Hermann ................ C04B 28/32
                                                106/685
4,131,405 A   12/1978 Moore
4,986,049 A    1/1991 Kennedy et al.
(Continued)

FOREIGN PATENT DOCUMENTS

| JP | 54030252 | 3/1979 |
| JP | 10211610 A | 8/1998 |
| KR | 20080093007 | 10/2008 |

OTHER PUBLICATIONS

International Search Report dated Feb. 9, 2011, corresponding to PCT/SE2010/051206.

*Primary Examiner* — Laura Auer
(74) *Attorney, Agent, or Firm* — Young & Thompson (57) ABSTRACT

A cast sheet that consists of a non planar net structure with cavities, where the net structure spread across a plane and where the cavities can form holes from one side of the sheet to the other. The cavities on both of the sides of the sheet can be arranged in identical structures where the structure of both sides are displaced or rotated in relation to each-other. Also described is a form template for casting of such a sheet and a method for producing such sheet.

24 Claims, 7 Drawing Sheets

(56) References Cited

U.S. PATENT DOCUMENTS

| | | | |
|---|---|---|---|
| 5,339,592 A | | 8/1994 | Schmid |
| 5,340,387 A | * | 8/1994 | Smith .................... C09D 11/50 106/31.6 |
| 5,601,384 A | * | 2/1997 | Dawson ........................ 405/284 |
| 2003/0235272 A1 | * | 12/2003 | Appleby et al. ............... 378/147 |
| 2007/0101871 A1 | * | 5/2007 | Patterson ................. A47J 43/14 99/495 |
| 2008/0014410 A1 | * | 1/2008 | Johnston et al. ............... 428/141 |
| 2010/0276829 A1 | * | 11/2010 | Yang et al. .................... 264/101 |

* cited by examiner

Sound

Fig. 8

Wind

CAST SHEET AND METHOD OF PRODUCING THE SAME

FIELD OF TECHNOLOGY

Present invention refers to a cast sheet and a method of producing such sheet. The present invention further relates to ways of manipulating the shape of the sheet into non planar shapes.

BACKGROUND OF THE PRESENT INVENTION

Solid sheet materials have low mechanical strength per weight unit and a small exposed surface area per volume unit material. Sheet materials that are not solid can be produced by extruding or casting viscous matter in a rigid mould. Otherwise the separate units have to be joined, which is a time and cost consuming process.

One aspect of the present invention is therefore to provide a cast sheet with larger surface-area per volume unit and higher mechanical strength per weight unit compared to corresponding solid sheet materials but which is still comparatively easy to produce. Furthermore less viscous substances can be cast into complex shapes through the process according to the present invention.

Another aspect of the present invention is therefore to provide a mould and a method of shaping such mould according to the present invention in order to simplify production.

Production of moulds for casting of non planar shapes with a constant thickness can be complicated and time consuming. One purpose of the present invention is to simplify the production of cast sheets in simple or complex non planar shapes, in small or large quantities.

Another aspect of the present invention is to provide a simple method of producing cast sheets that are light permeable or have through holes.

These and other aspects are achieved through cast sheets and a mould and a method of producing such cast sheets according to the technical features of the independent claims.

SUMMARY OF THE PRESENT INVENTION

The aim of the present invention is to present a cast sheet that consists of two cooperating net structures, which together form a more complex net structure with partially enclosed cavities, where the net structures extend across a plane of a cast sheet and where the cavities may form openings from one side of the sheet to the other since the two sides form matrices, can meet in the formed sheet. This net structure produces higher strength per weight unit in comparison with corresponding solid sheets. Furthermore the structure of cast sheet give a larger exposed surface-area per volume unit in comparison with corresponding solid sheets, thus enhancing the efficiency of surface-chemical processes in and on the sheet material.

The net structure of the cast sheet can be formed by casting over one or more matrices with protruding cells on the surfaces. The matrices can be in the shape of a flexible form matrix or in the shape of a roller. The cells cause cavities that extend over the cast sheet's planes and the cavities cause complete, partly or no openings from the sheet's one side to the other. The cells that create cavities when casting are arranged in structures wherein the structures of the two form matrices are displaced in relation to the other. This exposes furthermore surface per weight unit material which can be furthermore advantageous. The displacement can be achieved by moving one form matrix in relation to the other or by rotation of one of the form matrix's pattern in relation to the other with up to 90°. Through rotation an even thickness can be achieved across the entire sheet. The rotation making it impossible for the cells of one flexible form matrix to, over large surfaces, align with the cells or spaces between the cells of the other flexible form matrix. Through rotation of one of the form matrices, a repetition of instances, where cells of one side are centred over cells on the other side, occur evenly distributed across the plane of the sheet, thus creating an even thickness of the sheet across the cast sheet's plane. For flat, planar, sheets casting could be done without internal displacement and still producing sheets of even thickness. When an even thickness, of the created sheet, is not sought for, displacement is not necessary.

The present invention therefore refers to a cast sheet comprising a casting substance with a first and a second surface separated with a thickness D wherein the first surface contains a plurality of cavities with a maximum depth D1 wherein the cavities form a pattern and wherein the second surface contains a plurality of cavities with the maximum depth D2 wherein the cavities form a pattern and wherein D3<D, D2<D and wherein D1+D2>D.

The present invention also refers to a form matrix for casting of such cast sheet. The form matrix consists of a flexible film/membrane, on which cells/containers are arranged, onto which the casting substance can be added. The casting substance can be distributed on the cells and the spaces between the cells.

The present invention also refers to a method of producing such a cast sheet. The method according to the present invention for producing a sheet of a casting material with the thickness D comprises the steps:

providing a first form matrix comprising a first surface with a plurality of protruding cells in a pattern and wherein the cells protrude a maximum height H1 wherein H1<D;

providing a second form matrix containing a second surface with a plurality of cells in a pattern and wherein the cells protrude a maximum height H2 wherein H2<D;

placing casting substance between two spaced form matrices;

adding pressure to the form matrices until the two surfaces are at the distance D from each other in order to remove entrapped air in the casting substance; and letting the casting substance harden The casting method can preferably be performed at room temperature, i.e. between 15-25° C.

The present invention provides an easy method of producing non planar shaped sheets. Through the use of a flexible and/or semi-elastic form matrix, the sheets can be manipulated prior to hardening of the cast substance. The cells of the form matrices limit the thickness of the sheet and stop the cast substance from being pressed out and from flowing out towards the low points of the shaped sheet.

In one embodiment of the present invention, the casting substance can be a cement based substance, for example concrete.

In another embodiment of the present invention, the casting substance can be a polymer which has a $T_g$ below room temperature, for example a polymer based on epoxy.

The present invention could be used in a variety of application for example as green walls, catalytic surfaces, sound adsorbing walls, construction materials, moulds, furniture, lamps and pottery.

DESCRIPTION OF PREFERRED DESIGN

In the present application the terms "form matrix" or "matrix" are used interchangeably and refer to the material used to obtain a surface texture or pattern or a penetrating texture when casting.

In the present application the term "form template" refers to a non planar object which can be used to shape unhardened sheet.

In the present application the term "plane" is used to describe cast sheet and how it extends in space. The plane constitutes the direction of a sheet at any point.

In the present application the terms "form" and "mould" are used interchangeably.

Figure 1:
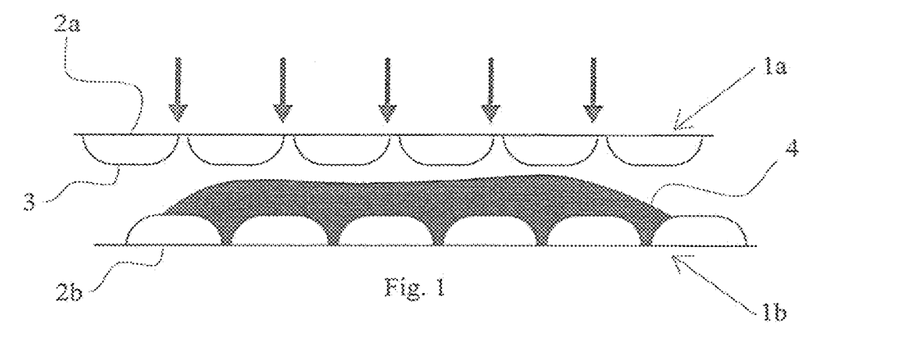
FIG. 1 illustrates two form matrices for casting of sheet in accordance with the present invention

FIG. 1 illustrates two form matrices 1a-b for casting of sheet in respect to the present invention. The form matrices consist of a plastic foil 2a-b with a set of cup-shaped plastic-foil-cells 3 which are air-tight connected to the plastic foil 2a-b with glue or by plastic-welding. The cup-shaped cells contain air and the cells are distributed, preferably in a pattern, over one side of the surface of the form matrices. Preferably there should be a plurality of cells spread across the surface of the form matrix, that is there should be more than two cells, but preferably more than 10 or more preferably more than 30 and it can be several hundred. The form matrices could each be made out of the same material or different materials and could be made of plastic, rubber materials or metal.

In the figure a first form matrix 1b is arranged with the cells facing up and concrete 4 has been distributed on the form matrix. The concrete has partially sunk down in-between the cells. A second form matrix 1a, preferably arranged on top of the first form matrix, is intended to be pressed against the first form matrix with unhardened concrete between the two. The second form matrix has the cells facing the first form matrix and when the second matrix is pressed against the first matrix the concrete can be pressed out in-between the two form matrices and into the spaces between the cells.

Figure 2:
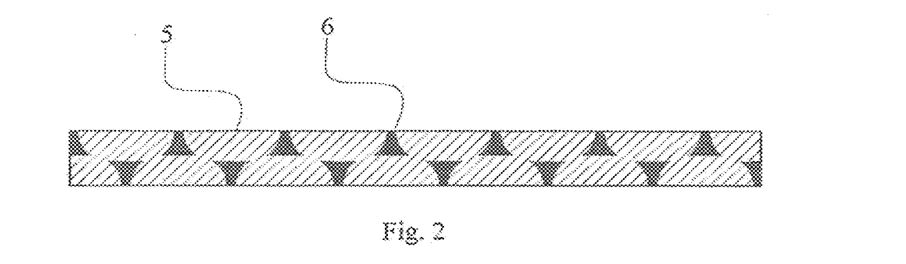
FIG. 2 illustrates a cross-section of a cast sheet according to the innovation

FIG. 2 illustrates a cross-section of a cast sheet in accordance with the present invention where cavities 5 have been formed in the net structure of concrete 6. The cast sheet can be produced with the method described above where unhardened casting substance, for example concrete, can be pressed out between two form matrices. To facilitate that the concrete is distributed into all the spaces between the cells, pressure can be applied onto the form matrices. This can be performed one-sided by resting the first form matrix on a flat surface, while an even distributed pressure can be applied on the second form matrix, or by applying a pressure on both matrices. In order to reduce the risk of having air entrapped in the casting substance during hardening and for a more efficient production the two matrices with inter-laying concrete can be pressed with a roller. The roller is in that case a cylindrical roll with a circular section and the support can be a substantially flat surface or also a cylindrical roller.

In one embodiment the second form matrix can be in the form of a roller. The surface of the roller comprises protruding cells arranged on the surface forming a pattern. The roller and/or the cells can be made out of metal, plastic or rubber based material and only the first form matrix needs to consist of a plastic-foil. In another embodiment, both form matrices are in the form of rolls as described above wherein no plastic-foil is used. In the cases with matrix-rolls, air and excess water can be removed by a combination of micro-perforation and vacuum-sucking.

In one embodiment of the present invention the roller/rollers can be still and the form matrices and casting substance be forced through the space between the roller and the support surface. Optionally, the form matrices and casting substance can be still and the roller be rolled over the surface.

In another embodiment of the present invention at least a part of the pattern of the form matrices during application of pressure are displaced in relation to each other. This could be a result of one or a part of the matrices move or rotate when pressure is applied.

Casting is also possible with an even distributed pressure, over the entire surface but the form matrix must in that case be micro-perforated to allow air to be sucked out; otherwise there may be a risk that the air is trapped between the form matrices' cells. Instead, in another embodiment the pressure is applied incrementally to one of the form matrices. This could be done by sliding or rolling a weight over one of the form matrices from one point to another. This could be done by using a roller for example. Alternatively, the weight or the roller could be still and instead the form matrices with the casting substance in between are forced under a roller or weight. The pressure could be applied from one end to the other or from the any other point on the form matrices.

FIG. 2 illustrates a cast sheet that consists of two net structures joined together. The two net structures have in the figure been placed displaced in relation to each other with half a cell-width, so that the top of the cells of the second form matrix come in contact with concrete between the cells of the first matrix. The width of the cast parts can be smaller than the bottoms of the created cavities, so that holes are formed in the cast sheet from one side to other. The casting substance between the cells of the two form matrices will be so thin that the sheet will appear as being semi-transparent or translucent. The thickness will depend on the diameter of the largest grains/particles of the casting-substance used. By the use of lower pressure or larger grains/particles in the casting substance an opaque, thicker and stronger sheet can be produced. By displacing the two form matrices the patterns of the two surfaces may at least partly be displaced in relation to each other.

The openings from one side of the sheet to the other side can be formed where the cells of one form matrix are very close to or are in contact with the cells of the other form matrix. Since the casting substance can be distributed over the first form matrix and only the main part of the concrete can be pressed out a thin layer of casting substance remains even where holes from one side to the other were meant to be formed. These thin layers can be removed if a higher degree of light permeability is intended, for example by spraying the surface with water or air under high-pressure. The thickness of the layer could also be controlled by changing the size of the largest grains in the casting substance-mix which sets the limit to how close the cells of the two form matrices can reach to touch one another.

To achieve holes from one side to the other without post-casting treatment, a surface retarder can be applied to a form matrix that hinders or slows down the hardening of the concrete. By applying the surface retarder where holes through the sheet are intended the unhardened concrete remains in these places. The unhardened concrete will fall off or can easily be removed by spraying with water, leaving openings with well-defined edges.

The diameter of the cells of the form matrices can vary. In the case where the cells consist of air-filled bubbles, the height of the bubbles should not exceed its diameter. In one embodiment the diameter should not exceed 50 cm for any bubble and the height of the bubble should not exceed 10 cm. Additionally, the shape of the cells can be of any type of shape such as spherical to elliptic to rectangular to pyramidal.

The ballast of the concrete mix should be fitted to the chosen distance between the cells of the form matrices and when non planar shaping the sheet the largest chosen grain could be approximately the closest distance between two cells in a form matrix. This to hinder movement of the concrete after the sheet has been pressed.

Figure 3:
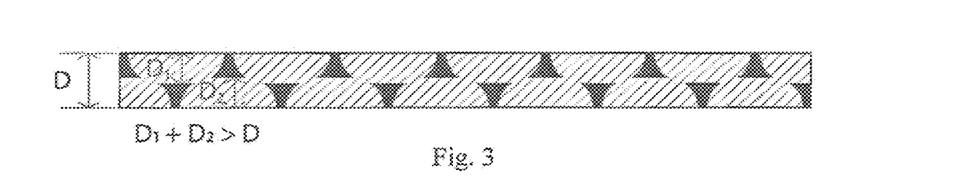
FIG. 3 illustrates the relation between the cavities depth and the sheet's thickness
Figure 4:
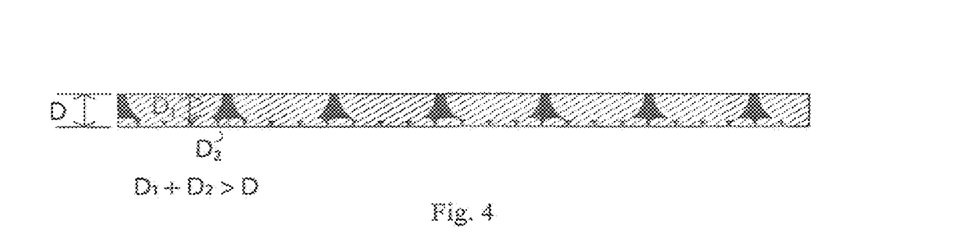
FIG. 4 illustrates the relation between the cavities depth and the sheet's thickness

FIG. 3 and FIG. 4 illustrates the relation between cavity depth and sheet thickness. To create cavities that create openings from one side to the other in cast sheet, the height of the cells (H1+H2) of the two form matrices put together, should be larger than the thickness D of the sheet (H1+H2>D). The depths of the two side's cavities, in relation to the thickness of cast sheet, are in one extreme case 95% for one side and >5% for the other. In the other extreme, the cavities of both sides are each 50% or more of the thickness of cast sheet but less than 100% ($D_1$<D and $D_2$<D).

To make an opaque sheet, that is stronger and less permeable to sound, larger grains are used in the cast substance to regulate how close the two form matrices can be pressed together. Therefore in one embodiment the sum of the maximum cell heights and the maximum grain size of the casting substance is more than the thickness of the sheet, i.e. H1+H2+ (maximum grain size of the casting substance)>D. Further, the sum of the depths ($D_1$+$D_2$) of the cavities together with the largest grain-size in the casting substance can be larger than the thickness of the sheet ($D_1$+$D_2$+grain size>D).

Figure 5:
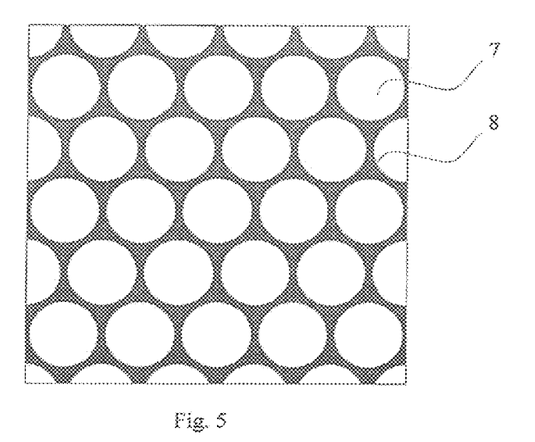
FIG. 5 illustrates the surface of the cast sheet, seen from above

FIG. 5 illustrates one side of cast sheet seen from above and it is forming a net structure 8 with cavities 7.

Figure 6:
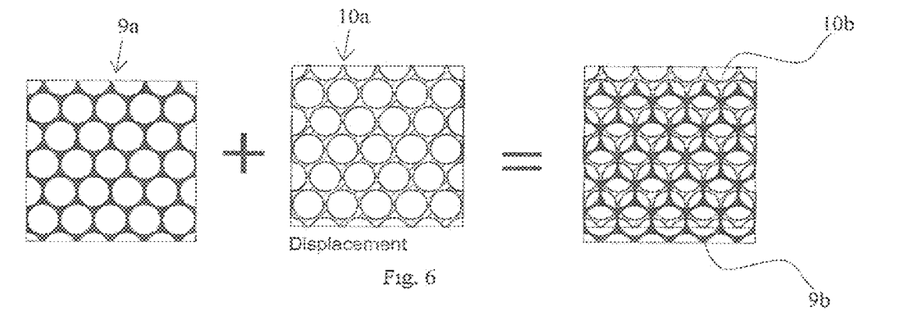
FIG. 6 illustrates the net structures of both sides of cast sheet, with displaced matrix pattern

FIG. 6 illustrates both sides of cast sheet with the cavity pattern 9a of one side displaced in relation to the other 10a. The sheet can be cast with two identical form matrices, facing each other, where the cells of one side 9b are aligned with the cells of the other side 10b. Displacement gives a thinner sheet compared to when the cells are aligned. When non planar shaping a cast sheet where the patterns are aligned or displaced, as described, parts of the sheet may have the cells/cavities aligned and parts of the sheet will have the cells/cavities displaced-possibly resulting in an uneven thickness of the sheet. If the sheet is produced with the cells displaced there may, after shaping of the sheet, be extra space for the concrete to fill where the cells align possibly resulting in a sheet of uneven quality. Likewise when the cells, before shaping, are aligned it may, when the sheet is shaped, result in uneven quality and an uneven level of light permeability.

Figure 7:
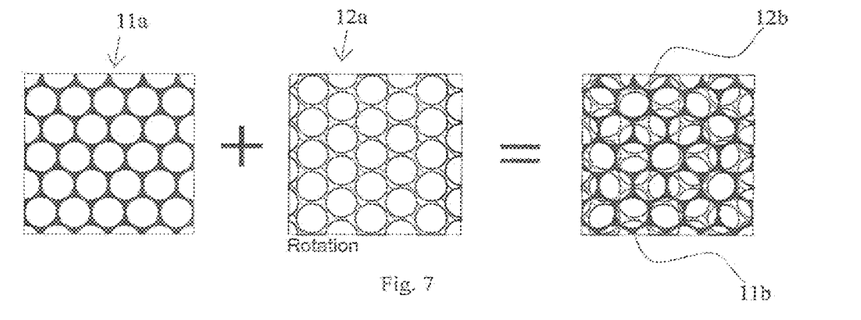
FIG. 7 illustrates the net structures of both sides of cast sheet with rotated matrix pattern

FIG. 7 illustrates both sides of cast sheet, created with two identical form matrices with one matrix 11a rotated in relation to the other 12a. Accordingly the cell patterns in both matrices 11b, 12b are not parallel, resulting in visually interesting structures such as interference patterns where larger patterns are spread across the sheet. Furthermore, in one embodiment the cells of the two matrices are aligned and spread repeatedly over the surface resulting in a sheet of even thickness, even when the sheet is non planar shaped.

Other alternatives are to cast sheet between two form matrices that are not identical. The matrices can for example be of different sizes as illustrated in FIG. 4. The cells of the form matrices can optionally have different shapes or/and can be separated by various and different distances. Furthermore the created net structure does not have to have any regular structure at all, but may consist of two connected net structures that form a sheet with cavities of the same or varying size and shape.

Figure 8:
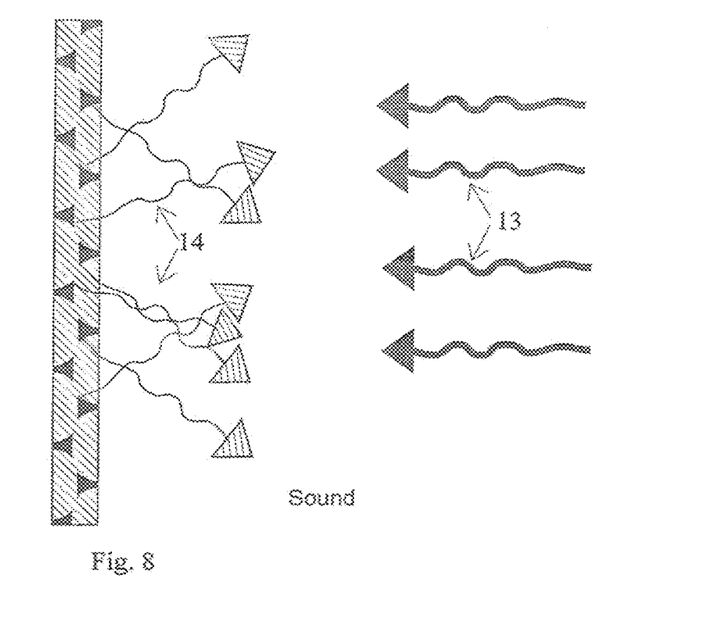
FIG. 8 illustrates the acoustic properties of cast sheet

FIG. 8 illustrates a cast sheet and its acoustical properties and the arrows in the figure illustrate incoming sound 13 and reflected sound 14. Since cast sheet has a very uneven surface sound can be reflected in all directions resulting in diffuse reflections. Parts of the sound will also be reflected multiple times in the sheet's cavities. These multiple reflections result in the loss of sound and that a relative small proportion of the incoming sound can be reflected. These interacting effects, absorption and diffusion of sound are advantageous for sound-absorbing applications. Further a cast sheet according to the present invention can be advantageous when sound-diffusion with a controlled lasting time of a lingering tone is desired. Through the possibilities to, in an easy way, control the sheets non planar shape and the level of sound-permeability, cast sheet can be very appropriate for use in acoustically sensitive situations, for example in music-halls.

The net structure with cavities of the cast sheet also gives a larger exposed surface than a corresponding solid sheet and this can be used for surface chemical reactions. One application requires the addition of titanium dioxide to the casting substance. The titanium dioxide can be used to break down oxides of nitrogen. The efficiency increases with increasing exposed surface to air and UV-light, which makes the present invention suitable for this type of application. In another embodiment, the surface of the sheet can be covered with micro organisms.

An efficiency test was done on two different cast sheets. One was cast in accordance with the present invention and one was cast in a flat, even form. Tests showed that the efficiency for breaking down oxides of nitrogen can be much higher for cast sheet cast in accordance with the present invention. The sheet that was tested had one centimetre deep cavities with a diameter at the sheet surface of three centimetres. The efficiency was measured to be 31% for cast sheet in accordance to the present invention, as compared to 11% for sheet with a flat, even surface. The cavity depth in relation to the diameter can be essential for the efficiency in these processes, the larger depth, the more efficient combustion. The influence of the depth on the efficiency can be however limited to the accessibility for UV-light to the created surface inside the sheet. Because of varying sun-conditions and that artificial light can be used, an optimized relation between the cavity diameter and depth can not be stated.

Figure 9:
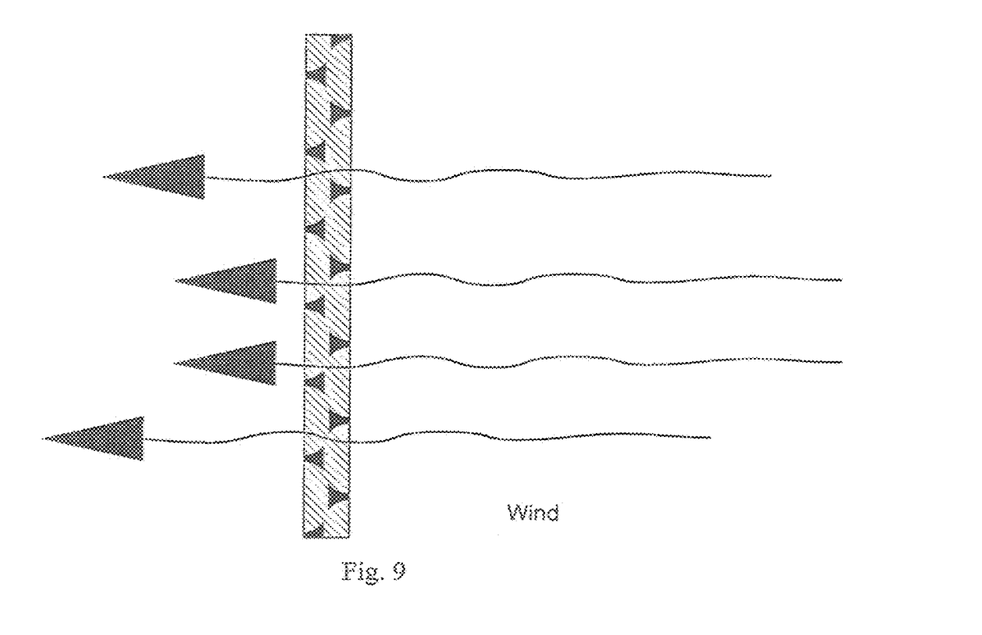
FIG. 9 illustrates the air-permeability of cast sheet

FIG. 9 illustrates the cast sheets permeability for air and wind. Owing to the sheet's net structure, holes from one side to other can be formed which lets air pass through and such sheets are less affected by wind-loads than corresponding solid sheets are. The permeability counteracts the turbulence that appears as a result in solid wind-barriers which can result in locally-increased wind-speed. The larger wind-movement can also make surface chemical processes more efficient as a larger volume air per time unit can be in contact with the sheet than would have been possible with a solid sheet.

Figure 10:
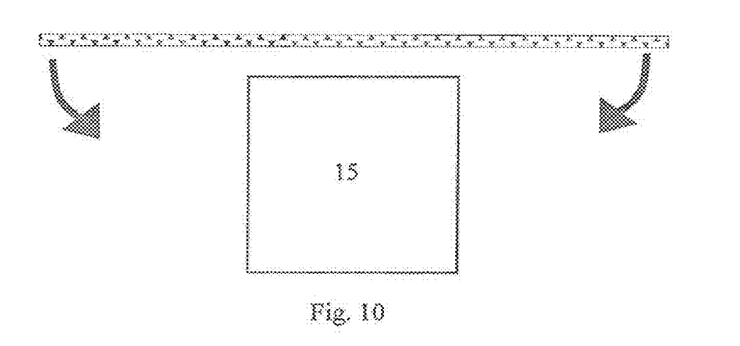
FIG. 10 illustrates unhardened sheet and a rectangular form template
Figure 11:
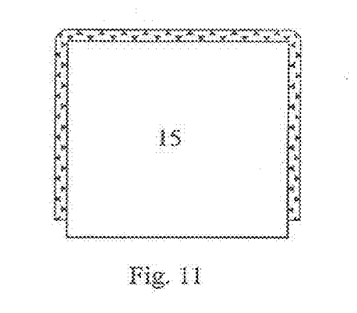
FIG. 11 illustrates sheet placed on the rectangular form template

FIG. 10 illustrates unhardened sheet with a rectangular form template 15 and the arrow illustrates how the sheet can be folded around the form template. In FIG. 11 the unhardened sheet has been placed around the rectangular form template 15 and can be held in this position during hardening. The sheet can afterwards be removed leaving a coherent non planar structure. The sheet in the figure, which has been cast using flexible form matrices on both sides and therefore with foil facing the rectangular form template 15, can easily can be removed after hardening.

Figure 12:
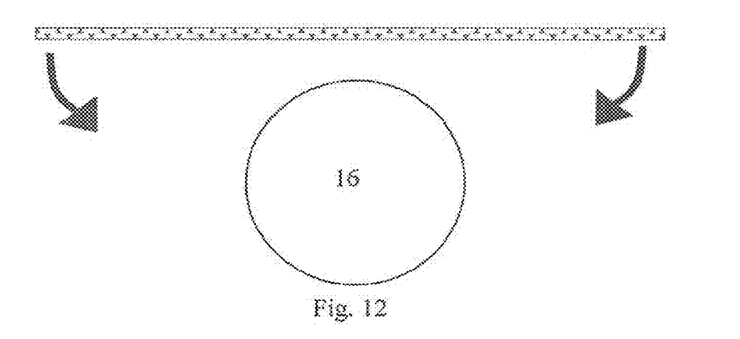
FIG. 12 illustrates unhardened sheet and a cylindrical form template
Figure 13:
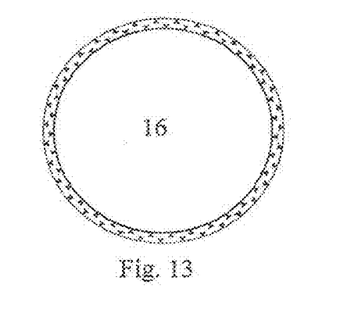
FIG. 13 illustrates sheet placed around the cylindrical form template

FIG. 12 illustrates an unhardened sheet with a cylindrical form template 16 and the two arrows illustrate how the unhardened sheet can be placed around the form template. In FIG. 13 the sheet has been placed around the cylindrical form template in such a way that it forms a closed cylindrical structure. This production method can be used for production of pipe-like structures and the form template 16 can after hardening be pulled out of the hardened cylindrical structure. Larger pipes or other structures can of course be cast in smaller pieces that later are joined together.

Figure 14:
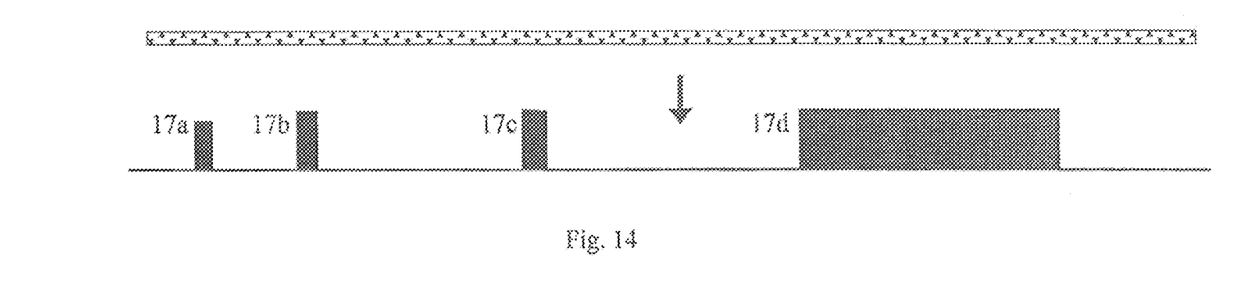
FIG. 14 illustrates unhardened sheet and an adjustable form template
Figure 15:
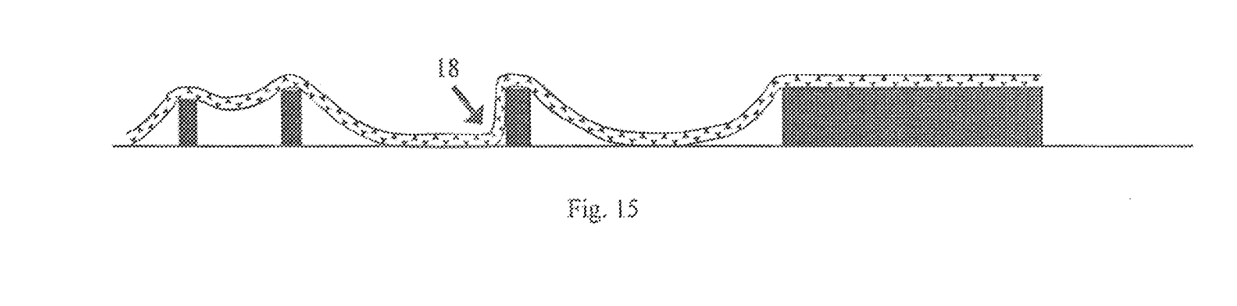
FIG. 15 illustrates sheet placed on the adjustable form template

FIG. 14 illustrates an unhardened sheet with an adjustable form template. The illustrated form template comprises four, in section, rectangular supports 17a-d that have been arranged on a flat surface. In FIG. 15 the cast sheet has been placed on the adjustable form template and it partly follows the form template. The bend-radiuses can be manipulated by applying pressure 18 and in such a way force the sheet down, between the supports. Sheet can be bent with an outer-radius limit to the thickness of the sheet. Also double-curved sheets can easily be produced with a limit in relation to the form matrices' elasticity. The method to create double-curved sheets gives much freedom in the shaping of non planar sheets.

Figure 16:
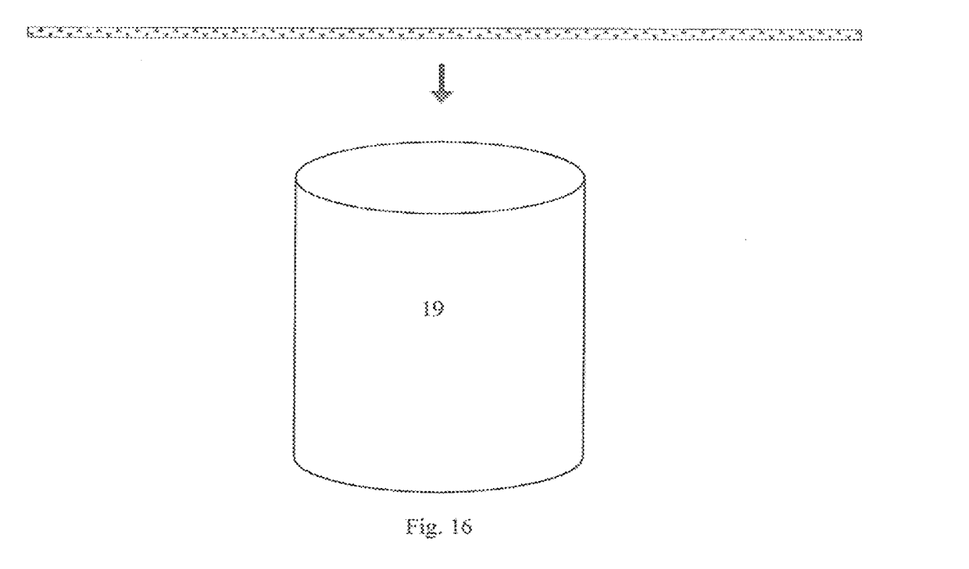
FIG. 16 illustrates unhardened sheet and a cylindrical form template
Figure 17:
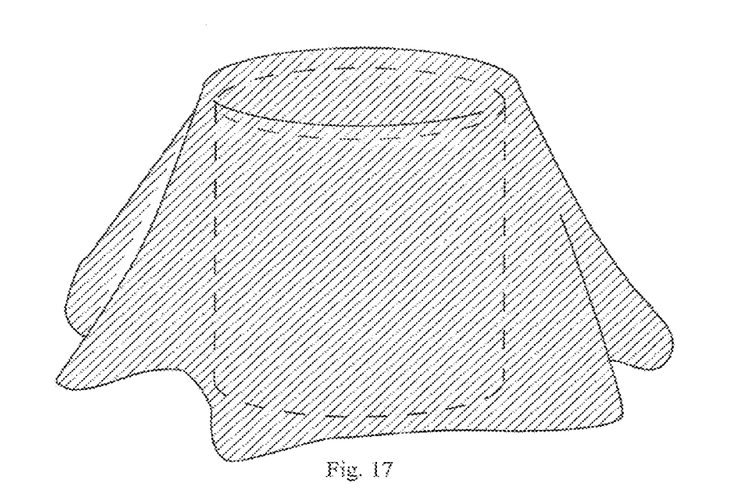
FIG. 17 illustrates sheet placed on the cylindrical form template

FIG. 16 illustrates an unhardened sheet with a cylindrical form template 19 and in FIG. 17 the sheet has been placed over the cylinder. The sheet bends and folds as it can be by its own weight pulled towards the ground, creating a constructively resistant structure that can be advantageous for a number of applications. Of course any other shape, or combination of shapes, of form template can be used for this kind of shaping of non planar structures.

Figure 18:
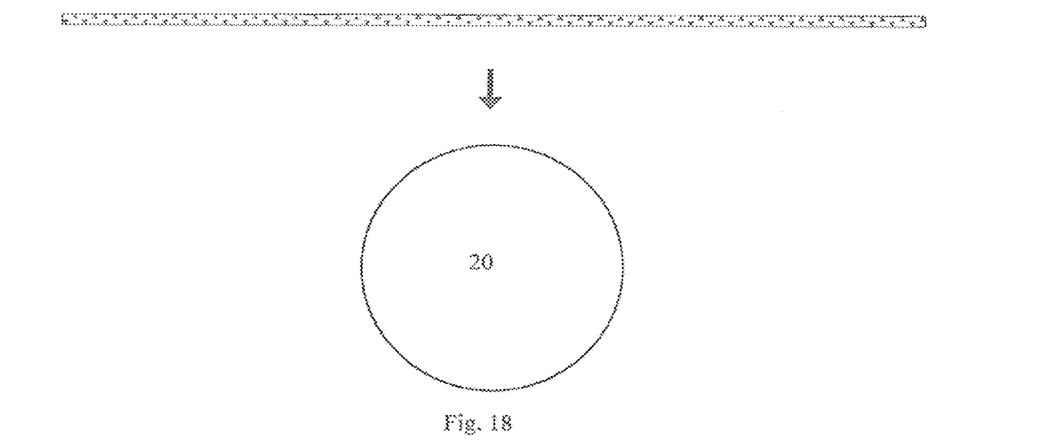
FIG. 18 illustrates unhardened sheet and a spherical form template
Figure 19:
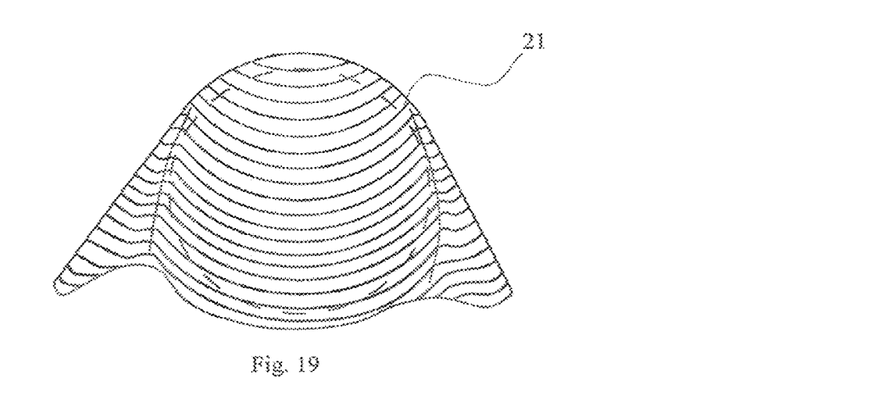
FIG. 19 illustrates sheet placed on the spherical form template

FIG. 18 illustrates an unhardened sheet with a spherical form template 20 and in FIG. 19 the sheet has been placed on the sphere. The flexibility and elasticity of the form matrices enables the sheet to follow the double-curved form template. When the elasticity no longer can match up to the form template's terrain-lines 21 folding of the form matrices appears. The folding can be used constructively as pillars or beams integrated in the cast non planar sheet. The process can, as mentioned, be used for casting of existing objects or terrain. It can also be used to produce complex non planar shaped sheets, which can be expensive and time-consuming with other methods.

The cast sheets can be mounted in pairs, parallel to one another and conditions for organic growth can be squeezed or by other means be held in place between the sheets. Plants will then grow out of the sheets' holes or break the thin layers of concrete, where the cells of the two form matrices have been touching, creating new holes and thus creating a "green wall". The leaves, roots and stems will bind the two sheets together, creating a coherent unit. The definition for conditions for organic is in this case: matter for holding moisture and seeds, bulbs and/or other early states of organic life.

Plastering of facades is problematic. The so-called one-layer-facades with plaster applied straight on insulation result in water permeating into the insulation and that the plaster fall off. Nowadays a structure can be built outside of the insulation to hold a plaster-carrier in place with an air gap to the insulation. Also plastering of entire facades can be difficult and time-consuming as a thick layer of plaster must be applied evenly, which can be heavy and it can be difficult to get an even thickness over the entire surface.

The present invention provides a plaster-carrier of relatively low weight and with a structure of cavities that plaster can easily connect with, which prevents plaster from falling off. Also less plaster needs to be applied. Furthermore the ability to shape the sheet makes shaping non planar facades possible in an efficient way.

When casting on-site cast structures the production of the moulds can be difficult and time-consuming. Furthermore the mould material gets worn and must be discarded after one or several casts. In most cases wood-based sheets are used to hold the concrete in place. Plastic, metal and rubber surfaces are also used as mould surface. The present invention provides a method for casting with a mould that does not need to be removed. Hardened sheets, separately or together with other sheets, are used as the mould. The sheets are mounted and the casting substance can be added into the space formed between the sheets. Prior to the addition of the casting substance some or all of the cavities of the sheets and the joints between sheets can be filled with casting substance to keep the sheets in place and to ensure impenetrability. To further ensure impenetrability the form matrix on the outside can be left until the casting substance has hardened. Cast sheet can also be used as a mould for casting of complex structures and then be removed. To do so the inner and/or outer form matrix is not removed from the sheet during casting. Cast sheet can be removed after hardening of the cast substance leaving a smooth, non planar formed, homogeneous cast object. In the case when the inner form matrix can be removed prior to casting of the homogeneous object, the object surface will be the cast sheet, more or less integrated with each-other. The low weight of cast sheet and the efficient method to create non planar shaped sheets provide a cost-efficient method to create large, solid, homogeneous structures.

Handling surface water can in some cases be problematic where there can be much "hard surface". To create a "soft surface" in places with much wear plastic and/or rubber based products are usually used. Sometime also concrete based products are used with holes from top to bottom. The present invention provides a sheet with good foothold that creates a "soft surface". The sheets are placed on a well-compressed foundation, after placement the sheets are covered with sand that will fall through the cavities to enable an even distributed pressure between the sheet and the foundation.

Another application of the present invention can be to place it on unhardened concrete or asphalt as protection against slipping.

One embodiment of the present invention can be a sheet of a material consisting of a first and a second surface separated with a thickness D, wherein the mentioned first surface contain several cavities with the maximum depth D1 (D1<D) and the mentioned second surface contain several cavities with the maximum depth D2 (D2<D), distinguished by that the sum of D1 and D2 can be greater than D. The width of the cavities of the two surfaces are labelled at the surfaces with W1 respectively W2, and in the bottom of the cavities with w1 and w2.

Of course the cast substance used can be other material than concrete and the form matrices can be of other material than plastic-foil. Furthermore the created cavities in cast sheet can be filled with casting substance of the same or different material or colour. The cells/containers 3 in FIG. 1 and the foil are exemplified in the described methods as made out of plastic-foil and the containers as cells, but off-course the containers can be solid and the containers and the foil consist of other material, for example rubber or metal.

The invention claimed is:

1. A sheet, comprising:
    a substance with a first and a second surface separated with a thickness D, the sheet being light permeable or having through holes,
    wherein the first surface contains a plurality of cavities with a maximum depth D1 wherein the cavities form a pattern and wherein the second surface contains a plurality of cavities with the maximum depth D2 wherein the cavities form a pattern and wherein D1<D, D2<D and wherein D1+D2>D,
    wherein the substance is a cement-based substance.

2. The sheet according to claim 1, wherein the sheet further comprises substance grains.

3. The sheet according to claim 1, wherein the sheet is non planar.

4. The sheet according to claim 1, wherein the sheet further contains titanium-dioxide.

5. The sheet according to claim 1, wherein patterns of the two surfaces are at least partly displaced in relation to each other.

6. The sheet according to claim 1, wherein the sheet is formed into at least one of green walls, catalytic surfaces, sound absorbing walls, construction materials, walls, sun screens, windows, moulds, furniture, lamps or pottery.

7. A method of producing a sheet according to claim 1 with the thickness D comprising the steps:
    providing a first form matrix (1a) comprising a first surface (2a) with a plurality of protruding cells (3) in a pattern and wherein the cells protrude a maximum height H1 wherein H1<D;
    providing a second form matrix (1b) containing a second surface (2b) with a plurality of cells (3) in a pattern and wherein the cells protrude a maximum height H2 wherein H2<D;
    placing the substance (4) between two spaced form matrices;
    adding pressure to the form matrices until the two surfaces are at the distance from each other in order to remove entrapped air in the substance; and
    letting the substance harden, wherein the sheet is light permeable or has through holes.

8. The method of producing a sheet according to claim 7 wherein the sum of the maximum cell heights is greater than D, i.e. H1+H2>D.

9. The method of producing a sheet according to claim 7 wherein the sum of the maximum cell heights and the maximum grain size of the substance is more than the thickness of the sheet, i.e. H1+H2+(maximum grain size of the substance)>D.

10. The method according to claim 7 wherein the form matrices (1a) and (1b) are flexible.

11. The method according to claim 7 wherein the cells (3) are air-filled.

12. The method according to claim 7 wherein at least one of the form matrices is a plastic foil.

13. The method according to claim 7 wherein at least one of the form matrices is made out of a rubber material.

14. The method according to claim 7 wherein both form matrices are plastic foils.

15. The method according to claim 7 wherein a surface retarder is added to at least one of the form matrices.

16. The method according to claim 7 wherein at least a part of the pattern of the form matrices during application of pressure are displaced in relation to each other.

17. The method according to claim 7 wherein the patterns of the form matrices are arranged such that the patterns of the first and the second form matrices are displaced in relation to each other.

18. The method according to claim 7 wherein the patterns of the form matrices are arranged such that the patterns of the first and the second form matrices are aligned.

19. The method according to claim 17 wherein the pattern of the second form matrix (1b) is displaced in relation to the pattern of the first form matrix (1a) by rotation.

20. The method according to claim 7 wherein the casting substance (4) is placed on the first surface (2a) followed by placing the second form matrix on the substance with the second surface (2b) facing the substance.

21. The method according to claim 7 wherein the method is performed at room temperature.

22. The method according to claim 7 wherein the pressure is applied incrementally to one of the form matrices.

23. The method according to claim 22 wherein a weight or a roller is moved from one point on the form matrix to another.

24. The method according to claim 7 wherein some or all cavities are filled with the substance after hardening.

* * * * *